2,967,800

ORGANIC MERCURY COMPOSITION

George J. Six, Wood-Ridge, William J. Leddy, Rutherford, and Eugene L. Cadmus, Glenridge, N.J., assignors, by mesne assignments, to Wood Ridge Chemical Corporation, Wood-Ridge, N.J., a corporation of Nevada No Drawing. Filed Nov. 26, 1957, Ser. No. 698,909

8 Claims. (Cl. 167—38)

The invention relates to an organic mercurial and to a process for its preparation. More particularly it pertains to the production of methyl mercuric nitrile and includes correlated improvements and discoveries whereby an organic mercurial having markedly desired properties is provided.

An object of the invention is the provision of an organic mercurial that disposes distinctive stability coupled with ready volatility.

A further object of the invention is the provision of an organic mercurial which is highly effective as a seed disinfectant.

Another object of the invention is to provide organic mercurial having a wide spectrum of solubility.

A particular object of the invention is the provision of methyl mercuric nitrile as a new organic mercurial.

An additional object of the invention is to provide a process in accordance with which methyl mercuric nitrile could be prepared readily, economically and efficiently to a desired extent.

Other objects of the invention will in part be obvious and will in part appear hereinafter.

The invention accordingly comprises the several steps and the relation of one or more of such steps with respect to each of the others, and the composition possessing the features, properties, and the relation of components, which are exemplified in the following detailed disclosure, and the scope of the invention will be indicated in the claims.

In the practice of the invention the preparation of methyl mercuric nitrile is accomplished by a procedure which entails reacting methyl iodide with mercury with the formation of methyl mercuric iodide. Thereafter, the excess of methyl iodide is removed from the reaction mass by steam distillation which suitably may be effected through the addition of the reaction mass to hot water. The methyl mercuric iodide thus formed is then reacted with an alkali metal cyanide followed by extraction of the reaction mixture with benzene and finally removing the methyl mercuric nitrile from the benzene solution by treatment with water.

More particularly, the methyl iodide should have a purity of at least 99% and the metallic mercury should be substantially 100% pure. The reaction is carried out under the influence of light with satisfactory results having been obtained through the use of a fluorescent light source with a range of wave length from about 3500 A. to about 5500 A. Further, the reaction of the methyl mercuric iodide with the alkali metal cyanide may be carried out in an aqueous medium with the alkali metal being selected from the group consisting of sodium, potassium and including ammonium.

Moreover, it is desirable that the cyanide be employed in an amount which is about 20% in excess of the stoichiometric proportion.

The extraction of the aqueous reaction mass with benzene forms a solution of methyl mercuric nitrile in benzene and from this solution the nitrile is removed by extraction with water.

As above indicated, the methyl mercuric nitrile is highly effective as a seed disinfectant and when so employed the composition for the disinfection of seed contains the methyl mercuric nitrile as the essential active constituent in conjunction with a carrier. The carrier suitably is a solvent for the nitrile and the concentration thereof is suitably about 1.8%. When the composition is used as for the disinfection of seed it may be applied thereto in any suitable manner, for example, by spraying thereon or by soaking the seed therein.

As an illustrative embodiment of a manner in which the invention may be practiced, the following procedures are presented.

Preparation of methyl mercuric nitrile photosynthesis

The apparatus consists of a reactor which may be of glass or glass lined fitted with a stirrer and a reflux condenser. The vessel is exposed to a source of light radiation. For this purpose a fluorescent light source having an emission in the range from about 3500 A. to about 5500 A. may be used.

There are introduced into the reactor methyl iodide, desirably having a purity of at least 99%, and metallic mercury substantially 100% pure. The proportion of mercury to methyl iodide may vary, but suitably ranges from about 20 to about 30 parts by weight of mercury per 100 parts by weight of methyl iodide. With vigorous agitation and under reflux, a light source is turned on, as above mentioned, and the reaction is permitted to proceed for a period. We have found it desirable to terminate the reaction when the boiling point of the reaction mass has risen to about 44.5° C., indicating a concentration of approximately 575 grams of methyl mercuric iodide per liter.

The methyl iodide layer, now rich in methyl mercuric iodide, is decanted from any unused mercury. Methyl iodide is steam distilled by adding the solution gradually to a vessel of hot water, whereby the methyl iodide and water vapor distill, are condensed, and the methyl iodide separated and recovered. There remains in the still a slurry of methyl mercuric iodide in water. The concentration of such slurry may vary but as the result of a typical reaction consists of about 500 grams of methyl mercuric iodide per kilogram of water.

Conversion to nitrile

To the slurry of methyl mercuric iodide in water there is added an aqueous solution of alkali metal cyanide, thus, sodium, potassium, lithium, and including ammonium cyanides, in sufficient quantity to react with all the methyl mercuric iodide. We have found it desirable to employ about a 20% excess of the cyanide, e.g. sodium cyanide, above the stoichiometric proportion. The reaction mixture is stirred until all of the solid material has gone into solution. The addition of some water may be necessary to accomplish this; and the final solution may contain about 400 grams of methyl mercuric nitrile per liter.

Extraction

The aqueous solution obtained from the methyl mercuric iodide and alkali metal cyanide reaction is then extracted with fresh distilled benzene. This may be effected by introducing the benzene, by means of a pump, through a sparger or series of openings near the bottom of the vessel containing the aqueous solution; the benzene rises through the aqueous phase and overflows to a still which continuously provides fresh benzene while concentrating the benzene solution of methyl mercuric nitrile. The aqueous phase is thus exhausted of methyl mercuric nitrile, leaving a solution of alkali iodide with unreacted alkali metal cyanide, which may be treated for recovery of iodine.

The benzene extract, containing the methyl mercuric nitrile, is then transferred to a second extraction apparatus in which it is extracted with water. This is conveniently done by forcing water downward, as by means of a pump, through a spray nozzle or other device designed to distribute the water through the benzene phase; collecting the aqueous phase in the bottom of the vessel, withdrawing it through a trap, to prevent simultaneous withdrawal of benzene, and recirculating.

Typically, but not to be construed as limiting the process, the concentrations of methyl mercuric nitrile in the solutions may be as follows:

| | Grams/liter |
|---|---|
| Benzene extract | 15–20 |
| Water extract | 20–30 |

The aqueous phase from the benzene extraction, stripped of $CH_3HgCN$ and containing e.g. NaI, is withdrawn and treated to recover iodine, by chlorination. This provides a distinct economy since the $I_2$ is then used to manufacture more methyl iodide.

*Preparation of seed disinfectant*

The aqueous extract produced as above may be diluted with a suitable solvent and a dye added in order to yield a composition suitable for use as a seed disinfectant. As an example of such a formulation the following is given:

| Constituent: | Percent by weight |
|---|---|
| Ethylene glycol | 60 |
| Water extract of methyl mercury nitrile, sufficient to give solution containing mercury equivalent to | 1.5 |
| Water soluble dye | 0.5 |
| Water | Balance |

The seed disinfectant so prepared may be used in the amount of about ¾ fluid ounce per bushel of seed, e.g. wheat, rye and barley seed, and furnishes substantial and economical control of seed-borne fungi diseases.

It may be observed that the process effects the preparation of a highly toxic compound in a closed system. Moreover, the methyl mercuric nitrile is characterized by marked stability, believed to be due to the

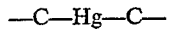

bond which is not present in other methyl mercury compounds used as seed disinfectants; high volatility which permits rapid diffusion through a mass of seeds; a wide spectrum of solubility which is induced by the following tabulation:

| Solvent: | Grams/liter |
|---|---|
| Methylene chloride | 1065 |
| Dichlorethylene | 1053 |
| Nitromethane | 1193 |
| Benzene | 710 |
| Chlorbenzene | 534 |
| Glycol | 510 |
| Chloroform | 500 |
| Isopropanol | 440 |
| Toluene | 330 |
| Water | 200 |
| Trichlorethylene | 44 |
| Carbon disulfide | 74 |
| Diethyl ether | 82 | and a toxicity to warm-blooded animals which is lower than other methyl mercuric compounds.

It will thus be seen that the objects set forth above, among those made apparent from the preceding description, are efficiently attained and, since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A process for the preparation of methyl mercuric nitrile which comprises reacting methyl iodide with mercury with the formation of methyl mercuric iodide, removing unreacted methyl iodide from the reaction mass by steam distillation, then reacting the thus purified methyl mercuric iodide with an alkali metal cyanide, extracting the reaction mass with benzene, and finally removing methyl mercuric nitrile from the benzene solution by treatment with water.

2. A process for the preparation of methyl mercuric nitrile which comprises reacting methyl iodide with mercury with the formation of methyl mercuric iodide, removing unreacted methyl iodide from the mass by steam distillation, then reacting the thus purified methyl mercuric iodide in an aqueous medium with an alkali metal cyanide, extracting the aqueous reaction mass with benzene, and finally removing methyl mercuric nitrile from the benzene solution by treatment with water.

3. A process for the preparation of methyl mercuric nitrile which comprises reacting methyl iodide with mercury with the formation of methyl mercuric iodide, removing unreacted methyl iodide from the reaction mass by steam distillation, then reacting the thus purified methyl mercuric iodide with sodium cyanide in excess of the stoichiometric proportion, extracting the reaction mass with benzene, and finally removing methyl mercuric nitrile from the benzene solution by treatment with water.

4. A process for the preparation of methyl mercuric nitrile which comprises reacting about 100 parts of about 99% methyl iodide with from about 20 to about 30 parts of about 100% mercury under the influence of light having a wave length from about 3500 A. to about 5500 A. with the formation of methyl mercuric iodide, removing unreacted methyl iodide from the reaction mass by steam distillation, then reacting the thus purified methyl mercuric iodide with an alkali metal cyanide, extracting the reaction mass with benzene, and finally removing methyl mercuric nitrile from the benzene solution by treatment with water.

5. A process for the preparation of methyl mercuric nitrile which comprises reacting about 100 parts of about 99% methyl iodide with from about 20 to about 30 parts of about 100% mercury under the influence of light having a wave length from about 3500 A. to about 5500 A. with formation of methyl mercuric iodide, removing unreacted methyl iodide from the reaction mass by steam distillation through addition thereof to boiling water, then reacting the thus purified methyl mercuric iodide in aqueous solution with sodium cyanide in an amount which is about 20% in excess of the stoichiometric proportion, extracting the aqueous reaction mass with benzene, and finally removing methyl mercuric nitrile from the benzene solution by treatment with water.

6. A method for the disinfecting of seed which comprises treating seed with a solution containing methyl mercuric nitrile as the essential constituent.

7. A method for the disinfecting of seed which comprises treating seed with a solution containing methyl mercuric nitrile as the essential active constituent, the concentration thereof being about 1.8%.

8. A method for the disinfecting of seed which comprises treating seed with a small but effective amount of methyl mercuric nitrile, said methyl mercuric nitrile being in the form of a solution in which it is the essential active constituent.

References Cited in the file of this patent

UNITED STATES PATENTS 1,938,839     Kharasch _____ Dec. 12, 1933

OTHER REFERENCES

Rochow et al.: The Chemistry of Organometallic Compounds, pp. 108–109, 1957.

Ellis et al.: The Chemical Action of Ultraviolet Rays, page 399, 1941.

Whitmore: Organic Chem., p. 77 (2nd printing), August 1937.

Norris: Organic Chem., p. 124, 1922.